Figure 1:
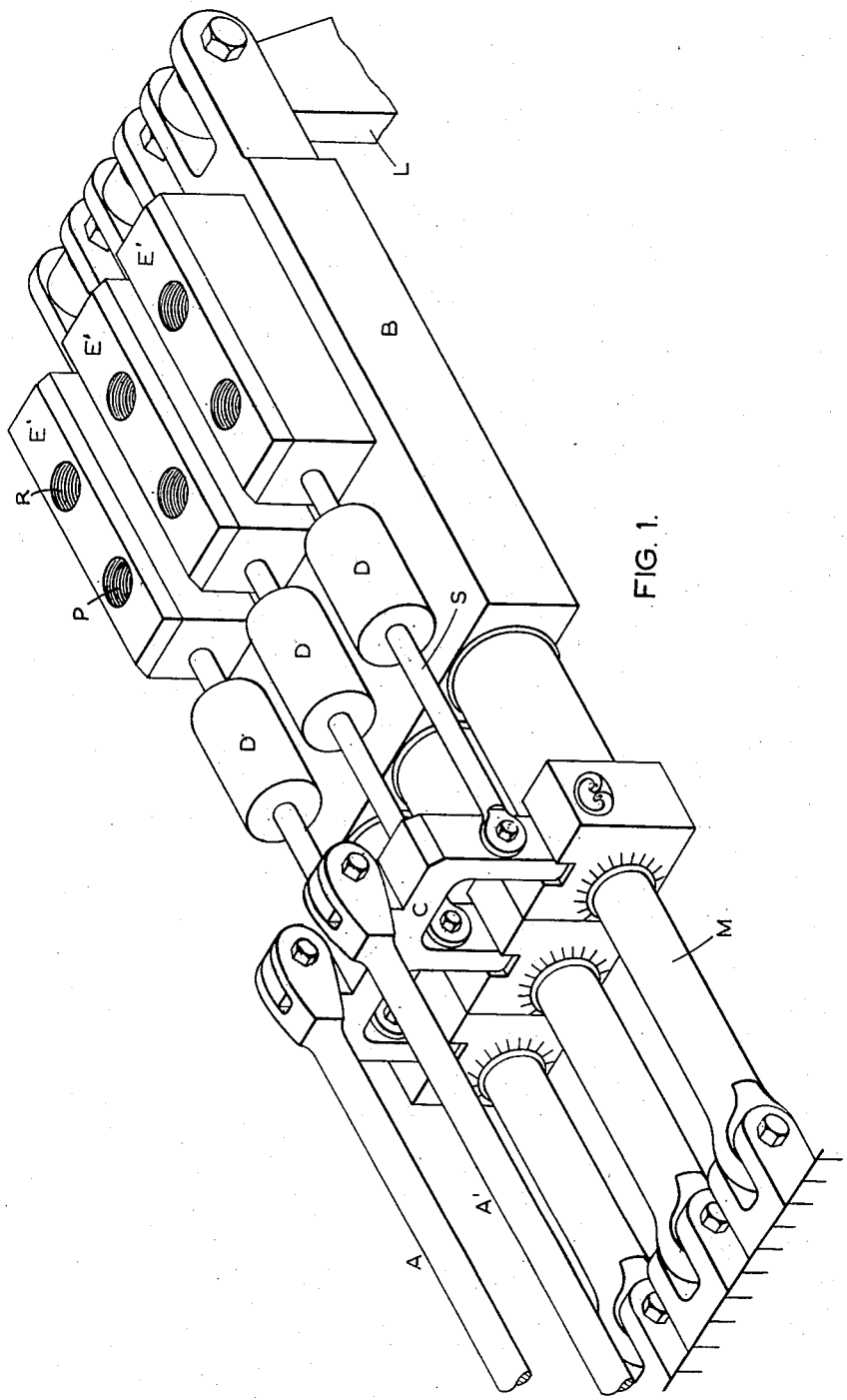

Feb. 7, 1961    J. SPRINGHAM    2,970,443
HYDRAULIC POWERED FLYING CONTROLS
Filed Nov. 19, 1958    2 Sheets-Sheet 1

INVENTOR:
JOHN SPRINGHAM
by Richardson, David and Verdon
ATTORNEYS.

INVENTOR:
JOHN SPRINGHAM

United States Patent Office 2,970,443
Patented Feb. 7, 1961

2,970,443

HYDRAULIC POWERED FLYING CONTROLS

John Springham, Brough, England, assignor to Blackburn and General Aircraft Limited, Brough, England, a British company Filed Nov. 19, 1958, Ser. No. 775,068

Claims priority, application Great Britain Dec. 16, 1957

4 Claims. (Cl. 60—97)

This invention relates to improvements in hydraulic powered flying controls, and has for its object to provide such a control system which is simple yet reliable, which will fail safe, and which is without electrical, mechanical or hydraulic operated cut-out or change-over devices subject to fail and decrease the overall reliability of the control system.

To this end according to the present invention, a control surface is moved by three mechanically-paralleled but otherwise independent servo-controlled piston jacks with resilient means interposed between movement applying members and servo-valve actuating members. Each jack has a non-return valve in a duct between opposite ends of its cylinder.

Further according to the present invention each of the three jacks is in a separate hydraulic circuit, pressurised from a common or separate source of power. Thus each circuit may be operated by one engine of a multi-engine aircraft or two by the aircraft engines and the third by a separate power plant.

Still further according to the present invention the movement applying means may be duplicated and connected to a mechanical part the movement of which is taken to the three servo-valve actuating members.

In normal use the three jacks will act simultaneously with equal effect to move the control surface. Should a servo-valve jam, full movement of the mechanism can still take place due to the action of the resilient means, conveniently in the form of a spring box, of the jammed valve, as the non-return valve of the jack with the jammed servo-valve will allow movement of that jack. A switch may be provided to give an indication of a jammed valve. With one valve not operating, the other two give ⅔ power which is adequate to move the control surface.

A hydraulic failure in any one of the three circuits, due to a burst or power failure, again only loses the power of one jack. In an extreme case of failure of two jacks, either due to jammed valves and/or hydraulic failure, the remaining valve giving ⅓ power available will still operate and give sufficient stiffness to avoid flutter of the control surface.

If a power plant independent of the aircraft engines supplies power to the hydraulic circuit of one jack or can supply power to all three circuits, the effect of aircraft engine failure is avoided and enables ground testing to be carried out without the engines running.

The three jacks may be in a common housing or each jack may be separate and identical for convenient connection and replacement.

Figure 2:
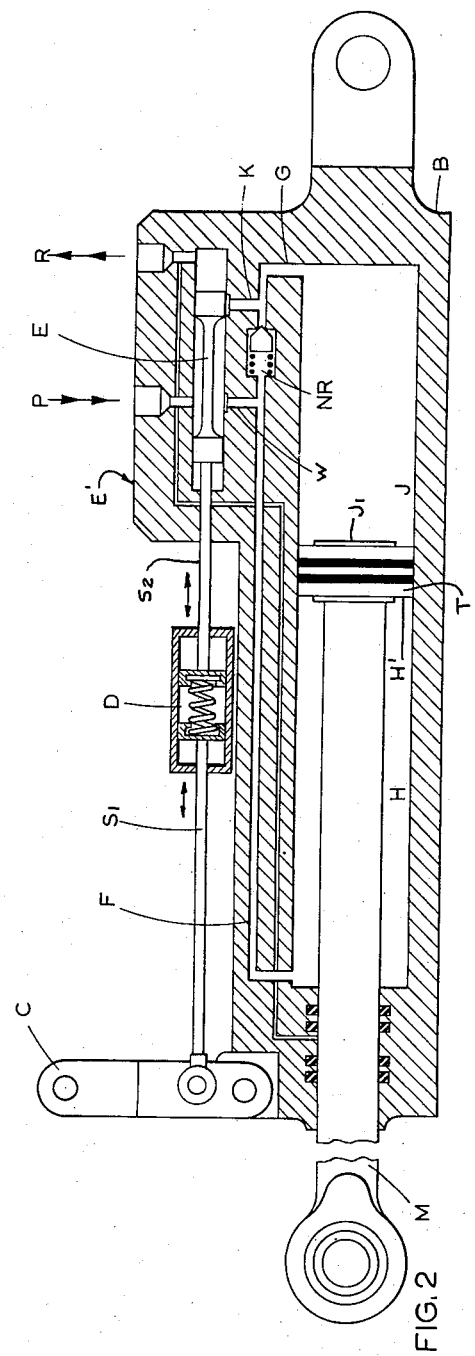

An embodiment of a triple jack, mechanically-parallel actuator is by way of example hereinafter more fully described with reference to the drawings, in which:

Fig. 1 is a perspective view of the three jacks with a common housing and actuated by duplicated control, and Fig. 2 is a section through one of the jacks and of its servo-valve.

The triple jack actuator hereinafter described is preferably operated by duplicated controls, such as are already known in the art, in which two movement imparting rods A, $A^1$ (see Fig. 1) normally move together but a failure in one half of the control system allows one such rod to move to impart the pilot's movements to the servo-valves without being impeded by the other rod.

Each of the operating rods A, $A^1$ is connected to a three arm pivoted member C forming a mechanical paralleling device and pivoting with respect to the bodies or common body B of three jacks of the double acting differential area type, each controlled by a servo-valve $E'$. The bodies of the three jacks are connected together and to the actuating member L of the aircraft control surface. The rams M of these jacks are connected to the aircraft structure.

The movement of the member C is taken to the respective servo-valves E by rods S1, S2, each of which rods has an end disposed in telescoping fashion in a spring-box D, whose spring is pre-loaded in excess of the maximum valve operating load so that with any valve jammed there may be full movement of the rods S1, S2 of the other valves.

As may be seen in Fig. 2, each jack is of the differential area type having chambers H and J separated by the jack piston T and fed with the full hydraulic system pressure applied from the inlet P to the chamber H through the port W and duct F, and applied to the chamber J through port K and duct G. The area of side $J'$ of the piston T to which pressure is applied in chamber J is approximately twice the annular area of side $H'$ to which pressure is applied in chamber H. The jack exhausts through the outlet R providing a return to tank connection means for hydraulic fluid.

As illustrated the piston T of the jack is in substantially mid-position and the servo valve E is in neutral position in which there is no flow of hydraulic fluid. On displacement of the rods S1, S2 to the left, the servo-valve E uncovers port K putting the jack chamber J in communication with the outlet R via duct G resulting in displacement of jack body B to the left.

On displacement of the rods S1, S2 to the right, servo valve E uncovers port K putting jack chamber J in communication with the pressure inlet connection P via duct G. Both chambers H and J are under common pressure, and due to the differential area of opposite sides of piston T, displacement of jack body B to the right will ensue. Since rams M are attached to the aircraft and since jack body B is attached to actuating member L of the aircraft control surface, movement of the jack body to the right or left (in Fig. 2), as explained above, causes corresponding movement of the aircraft control surface L. A non-return valve NR is introduced between jack chamber J and inlet connection P to prevent a hydraulic lock occurring in the event of the servo-valve E becoming jammed in the neutral position.

The jacks are of differential area type as stated above. The piston rod or ram M reduces the effective area of the piston in chamber H. If equal pressure is applied to both sides of the piston on movement of valve E to the right from the position shown in Fig. 2, a greater force will be applied to the larger area side $J'$ and body B of the jacks will move to the right from the position shown in Fig. 2 since rod M is fixedly connected to the aircraft structure. When the larger area of the piston is in communication with return port R on movement of the valve E to the left from the position shown in Fig. 2, the body B of the jacks moves towards the left from the position shown in Fig. 2. The aircraft control surface which is connected to body B moves in accordance with movements of body B with respect to the aircraft structure to which the rods M are connected.

The valve can jam under any of three conditions, with:

(1) The port K closed (as shown in Fig. 2);
(2) The port K connected to pressure port P, or
(3) The port K connected to return or exhaust port R.

*In case 1 with a servo-valve jammed with the port K closed (as shown in Fig. 2)*

(a) On selection of extension of the jacks (body B moving to the right) the lever C is rocked to the right. The spring in box D of the jammed servo-valve is compressed which allows normal travel of the other two servo-valves E to the right to connect their ports K to the pressure ports P of their respective jack bodies.

Pressure is now supplied to three compartments H and two compartments J; the jack body with the jammed servo-valve having no pressure supply to compartment J as port K is closed due to the jammed servo-valve. Now since the area J' is at least twice the area of H', the tendency to contract the three jacks is equal to three times the area of H' whereas the tendency to extend the jacks is equal to two times the area of J'. Since the area of J' is at least two times the area of H', two times the area of J' is equivalent to four times the area of H'. Therefore the net force tending to extend the jacks is equal to the pressure times one-half times the area of J'.

(b) On selection of contraction of the jacks (body B moving to the left), the lever C (Fig. 2) is rocked to the left and the spring in box D of the jammed servo-valve allows normal travel of the remaining two servo-valves E to the left which connects their ports K to the return or exhaust ports R. Pressure is now supplied to three compartments H and two compartments J are connected to the return or exhaust ports R, the jack body with the jammed servo-valve having no outlet from compartment J to exhaust as its port K is closed due to the jammed servo-valve.

The tendency to contract the jacks is now equal to three times the area H', and is resisted by the area J' of the body having the jammed servo-valve.

(1) As mentioned above the area of J is equal to two times the area of H'. Two times the area of H' will be required to balance the area of J' of the body having the jammed servo-valve, leaving a net force applied in compartment H employing one times the area of H' to produce contraction of the jacks.

The pressure build-up in compartment J of the body B having the jammed servo-valve is relieved through a non-return valve NR (Fig. 2) into the pressure line, thereby preventing a hydraulic locked condition.

(2) *In case 2 with one servo-valve jammed and with the port K connected to pressure port P*

(a) On selecting extension of the jacks (body B moving to the right) lever C (Fig. 2) is rocked to the right and the spring in box D, of the jammed servo-valve is compressed, thus allowing normal travel of the other two servo-valves E to the right which connects the ports K to the pressure ports P of their respective jacks.

Pressure is now supplied to three compartments J and the triplicated jack unit extends in a normal manner under full load.

(b) On selecting contraction of the jacks (body B moving to the left) the lever C (Fig. 2) is moved to the left. The spring in box D of the jammed servo-valve will be compressed and allow normal travel of the remaining two servo-valves to the left which connects the ports K to the return or exhaust port R of their respective jacks.

Pressure is now supplied to three compartments H and simultaneously pressure is supplied to one compartment J of the jammed servo-valve.

As previously mentioned one area J' is equal to two areas H', therefore there remains the one area H' on which a net force is exerted for contraction of the triplicated jack unit.

The fluid in compartment J of the jammed servo-valve body is transferred to the pressure supply line via the port K.

In the event of a jammed servo-valve whose port K is connected to pressure port P, the triplicated jack unit will extend normally at full pressure, and contract due to the pressure times the area of one piston face H'.

(3) *In case 3 with one port K connected to return or exhaust port R*

(a) On selecting extension of jacks (bodies moving to the right) the lever C (Fig. 2) is rocked to the right, the spring in box D of the jammed servo-valve is compressed and allows normal travel of the other two servo-valves E to the right which connects the ports K to the pressure ports P of their respective jacks.

Pressure is now supplied to three compartments H and simultaneously to two compartments J whilst compartment J of the jammed servo-valve body is connected to return or exhaust. The area available for extension is two times the area J' and is opposed by the area of three times H'. Thus the pressure times one-half the area of one J' is available for extension.

(b) On selecting contraction of the jack (bodies moving to the left) the lever C (Fig. 2) is rocked to the left. The spring in box D of the jammed servo-valve may be compressed (depending on position of jamming) allowing normal travel of the other two servo-valves, to the left which connects the ports K to the return or exhaust ports R of their respective jack bodies.

Pressure is now supplied to three compartments H and the three compartments J are connected to return or exhaust.

The triplicated jacks unit contracts normally under full load i.e., pressure times the area of three piston faces H'. In the event of a jammed servo-valve where its port K is connected to the return or exhaust port R, there is available for extension of the triplicated jack unit the pressure times one-half of the area of one piston side J' and on contraction the unit functions normally.

A feature of this device is that under all circumstances there is continuous control, there being no time lag in operation.

Preferably the hydraulic circuits, both as to supply and return, will be triplicated so that each jack will receive fluid from a separate circuit in order to avoid a hydraulic failure rendering the three jacks inoperative. The separate hydraulic circuits may be pressurised by separate engines of a multi-engine aircraft.

With this assurance and duplication of the pilot's controls, as already mentioned, a complete break-down is most unlikely and in all but an extreme case one operating rod A or A¹ will actuate the servo valve of at least one of the three jacks to effect movement of the aircraft control surface.

The triple jack actuators may operate the tail planes, rudder, and ailerons of the aircraft when the triplicated hydraulic circuits are paralleled or branched to the sets of three jacks controlling pairs of control surfaces.

I claim:

1. In a hydraulic powered flying control system, three parallel differential pressure type piston jacks, each jack comprising a ram and a body, means supplying pressurised hydraulic fluid to said jacks, a servo valve for each of said jacks for controlling the supply of fluid, each of said jack bodies including a cylinder with a piston therein movable by a ram, said piston dividing the cylinder into two chambers, each body having a duct opening into said chambers at opposite ends of the cylinder, a non-return valve disposed in the duct, inlet and outlet ports in the body communicating with said duct at opposite sides of the non-return valve, said servo-valve being located in a path of said fluid between said ports and said duct, a mechanical part for simultaneously actuating said servo valves, a control member, means connecting said control member to said part, a control surface operating member, and means for imparting the movement of said jacks to said operating member.

2. In a hydraulic powered flying control system, three parallel differential pressure type piston jacks, each jack comprising a ram and a body, a separate hydraulic system supplying pressurised fluid to each of said jacks, a servo valve controlling the supply of fluid to each jack, each of said jack bodies including a cylinder with a piston therein movable by a ram, said piston dividing the cylinder into two chambers, each body having a duct opening into said chambers at opposite ends of the cylinder, a non-return valve disposed in the duct, inlet and outlet ports in the body communicating with said duct at opposite sides of the non-return valve, said servo-valve being located in a path of said fluid between said ports and said duct, an operating member including a resilient device for actuating each servo valve, a mechanical part, means for connecting said operating members to said mechanical part, duplicated control members, means connecting said control members to said mechanical part, a control surface operating member, and means for imparting the movement of said jacks to said operating member.

3. In a hydraulic powered flying control system, three differential area pressure type piston jacks connected in parallel, each jack comprising a ram and a body, means connecting the rams of said jacks to fixed structure, means connecting the bodies of said jacks to a member moving a control surface, a servo valve controlling the supply of pressurised hydraulic fluid to each of said jacks, each of said jack bodies including a cylinder with a piston therein movable by a ram, said piston dividing the cylinder into two chambers, each body having a duct opening into said chambers at opposite ends of the cylinder, a non-return valve disposed in the duct, inlet and outlet ports in the body communicating with said duct at opposite sides of the non-return valve, said servo-valve being located in a path of said fluid between said ports and said duct, an actuating member including a resilient device for moving each of said servo valves, a mechanical part, means for connecting said actuating members to said mechanical part, and operating means for displacing said mechanical part.

4. In a hydraulic powered flying control system, three differential area pressure type piston type jacks each comprising a ram and a body, means connecting said jack bodies in parallel, means connecting said jack bodies to a member moving a control surface, a separate supply of pressurised hydraulic fluid to each of said jacks, a servo valve for controlling the supply of said fluid to each of said jacks, each of said jack bodies including a cylinder with a piston therein movable by a ram, said piston dividing the cylinder into two chambers, each body having a duct opening into said chambers at opposite ends of the cylinder, a non-return valve disposed in the duct, inlet and outlet ports in the body communicating with said duct at opposite sides of the non-return valve, said servo-valve being located in a path of said fluid between said ports and said duct, a servo valve actuating member including a resilient device, a three limb member pivoted to said jack bodies, means connecting said servo valve actuating members each to a limb of said three limb member, independently operable duplicate control means, and means for connecting said control means to said three limb member.

References Cited in the file of this patent
UNITED STATES PATENTS

| | | |
|---|---|---|
| 2,590,716 | Lisle | Mar. 25, 1952 |
| 2,597,418 | Westbury et al. | May 20, 1952 |
| 2,597,419 | Westbury et al. | May 20, 1952 |